United States Patent [19]
Seki et al.

[11] 4,144,580
[45] Mar. 13, 1979

[54] ELECTRONIC APPARATUS INCORPORATING A POWER SAVINGS FEATURE

[75] Inventors: Mitsuaki Seki; Jyuji Kishimoto, both of Tokyo, Japan

[73] Assignee: Canon Kabushiki Kaisha, Tokyo, Japan

[21] Appl. No.: 808,961

[22] Filed: Jun. 22, 1977

Related U.S. Application Data

[62] Division of Ser. No. 609,096, Aug. 29, 1975, abandoned.

[30] Foreign Application Priority Data

Sep. 3, 1974 [JP] Japan .................. 49-101177
Sep. 3, 1974 [JP] Japan .................. 49-101178

[51] Int. Cl.² .................. G06F 3/14; G06F 15/02
[52] U.S. Cl. .................. 364/707; 340/365 R; 340/365 C; 364/709; 364/710
[58] Field of Search .............. 364/707, 709, 710, 736; 340/336, 337, 365 R, 365 C; 200/5 A; 361/390, 399, 281; 197/98

[56] References Cited

U.S. PATENT DOCUMENTS

| 3,464,531 | 9/1969 | Herr et al. ...................... 197/98 |
| 3,668,698 | 6/1972 | Demirdjioghlou et al. ......... 340/365 |
| 3,740,744 | 6/1973 | Nakada ........................ 340/365 C |
| 3,769,621 | 10/1973 | Osborne ........................ 364/900 |
| 3,892,958 | 7/1975 | Tung ............................ 340/365 R |
| 3,912,368 | 10/1975 | Ponjee et al. .................. 340/336 |
| 4,047,012 | 9/1977 | Dickinson et al. .............. 364/736 |

Primary Examiner—Charles E. Atkinson
Assistant Examiner—Errol A. Krass
Attorney, Agent, or Firm—Fitzpatrick, Cella, Harper & Scinto

[57] ABSTRACT

A power control system for electronic machines is capable of realizing substantial power savings. A logic circuit is activated by electric energy produced by a mechanical-electric power converter means with the push of a key without requiring a power source such as a battery. Other elements such as power on-off switch can be also eliminated.

24 Claims, 8 Drawing Figures

ELECTRONIC APPARATUS INCORPORATING A POWER SAVINGS FEATURE

This is a Division of application Ser. No. 609,096, filed Aug. 29, 1975 and now abandoned.

BACKGROUND OF THE INVENTION

1. Field of the Invention

This invention relates to a power source control system for electronic machines, and more particularly to a control system according to which the power consumption of electronic machines, such as a portable type of battery-driven small sized electronic calculator, handy typewriter, etc. is extremely minimized, wherein an electronic circuit can be driven without a battery.

2. Description of the Prior Art

In conventional electronic calculators, once a power switch is turned on, power is continually consumed during the whole time until the switch is turned off. Also, in the portable type of battery-driven small sized electronic calculators, almost all of the power is consumed in display elements such as electroluminescent diodes. Therefore, there has been provided such an arrangement that the display elements are deenergized by a timer after a predetermined time has elapsed. However, this does not provide any decisive solution to the power saving problem. Actually, the time used for key operation in the use of a calculator is short, and the remaining time is spent mostly for arranging papers, preparing writing utensils, planning where to start the process, or answering the phone. Further, the smaller the number of parts, the better.

SUMMARY OF THE INVENTION

The present invention has been made with the object of overcoming such problems. More specifically, according to one feature of the present invention, the power on-off switch unit is eliminated and, instead, power connection is effected by operating a clear key, and immediately thereafter, the essential function of the clear key is practiced, that is, the inner circuits are all cleared to restore the initial setting. Further, power is shut off by every even-numbered clear key operation.

One feature of the present invention is that the power on-off switch is removed and, instead, both turn-on and turn-off of power are effected by pushing down a clear key. According to this system, power is supplied to the load only during the period when one arithmetic operation is being carried out, so that wasteful consumption of power can be avoided. Also, since the power switch unit can be eliminated, the entire assembly is simplified and can be manufactured at low cost.

Another feature of the present invention resides in providing an electronic machine in which the electronic circuit can be driven without a battery. That is, electric energy for driving the electronic circuit is generated by a mechanical-electric converter means disposed below the key top assembly, and such electric energy is used for directly driving the electronic circuit, or such energy is initially stored in a capacitor or such and gradually discharged to perform the same function as a battery.

It is also an important feature of the present invention that constant voltage or constant current is applied to the electronic circuit by a regulator means which regulates the quantity of electricity from said mechanical-electric converter means to a constant value, so as to always allow correct operation of the system.

DESCRIPTION OF THE PREFERRED EMBODIMENTS

Figure 1:
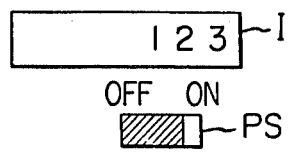
FIG. 1 is a front view of a conventional calculator.
Figure 2:
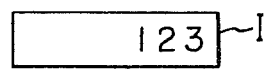
FIG. 2 is a front view of a calculator according to the present invention.
Figure 2:
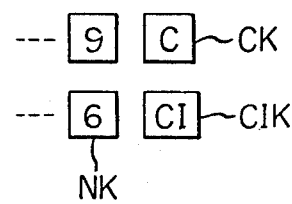
Figure 3:
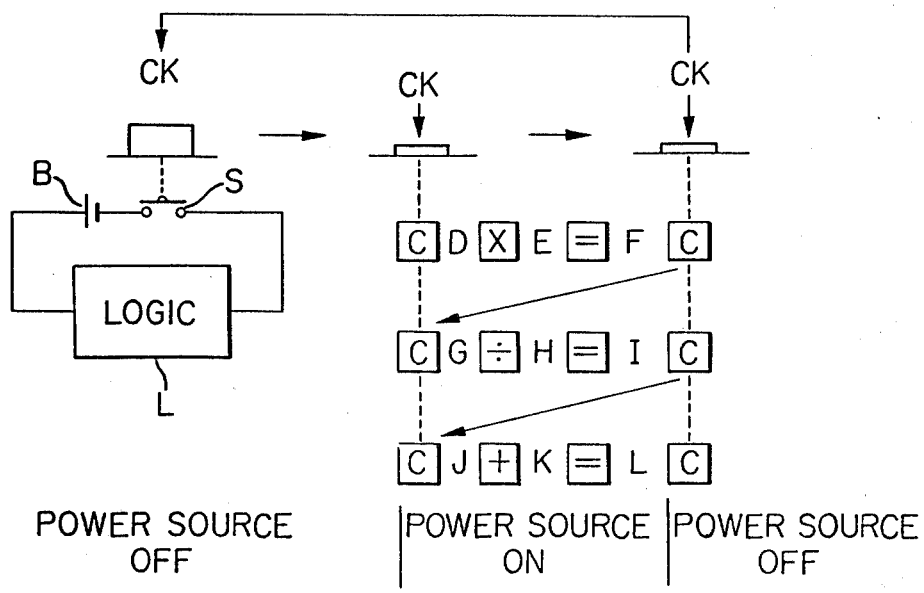
FIG. 3 is a diagram illustrating the principle of the first embodiment of the present invention.
Figure 4:
FIG. 4 shows a mode of operation of the numerical indicator device showing connection of power to the machine.

Referring to FIG. 1, there is shown a front view of a conventional calculator. In the figure, letter I designates a numerical indicator, PS a power switch, NK an assembly of numerical keys, CK an all-clear key, and CIK an indication register clear key. According to the present invention, as shown in FIG. 2, the power on-off switch PS is eliminated, and instead an improvement is made such that the clear key CK plays the role of said switch without compromising its essential function. For instance, when it is desired to perform processing of numerical formulae such as $D \times E$, $G \div H$, $J + K$, etc., as shown in FIG. 3, first the clear key CK is pushed down to close the switch S to connect the power source B to the calculator circuit unit L. Immediately thereafter, as is well known in the art, an all-clear signal is given out from the logic circuit to which power source B has been connected, thereby clearing all the circuits. This one-touch operation can dispense with the conventional power switch turning-on operation and clear key pushing-down operation. Also, arrangement is made such that, under this condition, the numeral 0 in the first column on the indicator, which concurrently serves as a power source ON indicating lamp, is usually lighted as shown in FIG. 4, so that the operator can know from this that the calculator has been set into a live state. This is the same arrangement as used in conventional systems. Also, if the clear key CK is formed from, for example, a lock switch, it is kept depressed once it is pushed down, so that the power source ON state can be maintained all the while until the next push-down is made on said switch.

Therefore, the power source is kept on during the operation of $D \times E = F$, and this period is usually extremely short as compared with other periods even if not operated by a skilled operator. Then, when the clear key which has once been depressed as shown in FIG. 3 is again pushed down, it restores the original position to turn off the power, so that no power is consumed therafter. Therefore, no waste of time is made even if the preparation for the next operation, arrangement of slips and/or other works are done with sufficient time alloted therefor. For conducting the next operation of $G \div H$, the clear key CK is again pushed down similarly to connect power, and immediately thereafter, the result of the preceding operation is cleared, so that calculation of G ÷ H can be accomplished with no impediment.

In case it is necessary to preserve the result of the previous operation and use it for the next constant operation or such, the power source won't be turned off unless the clear key is pushed down a second time, so that it is possible to conduct as many arithmetic operations as desired in succession. As the power source is turned off by the second depression of the clear key upon completion of a series of operations, no power consumption is made even if the system is left as is. Then, when the clear key is pushed down for the third time, the system is again turned into an operable state, allowing the operation of J + K. This series of steps is shown in FIG. 3. Whether the clear key has been operated for an odd number of times or for an even number of times can be known from the power source ON indication (lighting of numeral 0 on the first column) in the indicator of FIG. 4, so that there is little chance of committing a misoperation. Also, if a timer mechanism is incorporated in this arrangement to allow indication of the lapse of a certain given period of time, or driving for a certain fixed period of time after an odd number of times of clear key operations, wasteful power consumption can be further lessened to allow appreciable prolongation of the battery life. Also, if a battery which has been used to some extent is turned on and off a plural number of times, the life of such battery can be elongated. The AC power saving effect of the present invention can be provided by adapting the present invention not only to battery-driven portable calculators but also to small-, medium- or large-sized electronic calculators of the AC power-driven type. It is also possible to employ as a clear key not only a lock switch but also an electronic lock circuit such as a trigger flip-flop.

Figure 5:
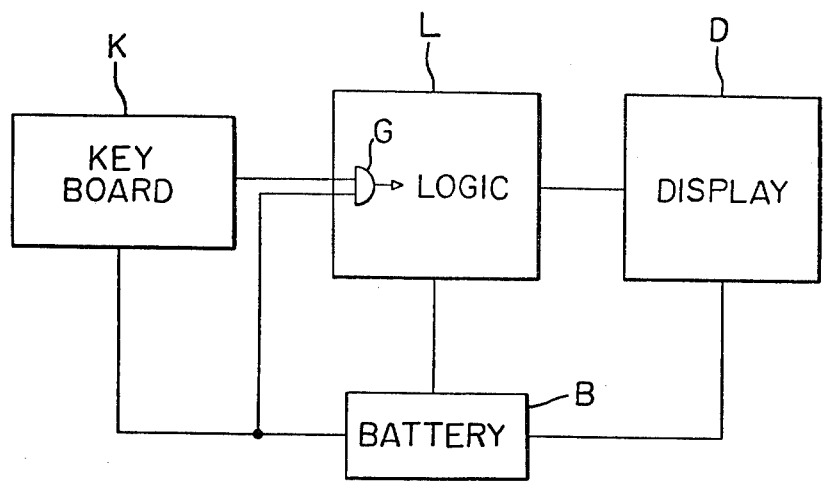
FIG. 5 is a block diagram showing a second embodiment of the present invention.

The electronic circuit and indicator device used in this embodiment of the invention can be made of a known material, but if such material is properly selected, it is possible to form a system which has even less battery consumption than the embodiment shown in FIG. 3. FIG. 5 shows such example where a nonvolatile semiconductor, which use has been industrially accepted only recently, is used for the logic circuit L. Used as display D is a printer or a solid number indicator using a non-volatile display material which has also been put to practical use recently. In the figure, B is a battery, K a key board, and G an AND gate. In this arrangement, battery B does not constitute a closed circuit with either of K, L and D. Let us here discuss the example where the operation of A × B = C is conducted.

First, when the clear key C in the key board K is pushed down, the output of battery B is impressed to the gate G in the electric circuit of the non-volatile semiconductor, whereby said gate G is opened to effect ordinary inner circuit clearance by said output. If the clear key is released, the AND gate G is closed, so that battery B is no longer consumed. The time required for steps such as clearing, arithmetic operating, etc., in the semiconductor circuit is extremely short as compared with the time required for key top depressing, and hence all the necessary steps carried out by the circuit can be accomplished within the period of key top depression. The longest operating time comes immediately after depression of the key ⊟, and in the case of small-sized portable electronic calculators, the number of figures that can be displayed is about ten at most. But, if the key ⊟ is kept pushed down for a slightly longer period of time until display of the answer is completed, or if electric energy which has been entered so far is accumulated in a capacitor or such and discharged at the time of practice of operation, it is possible to obtain the result of operation of twice as many figures, that is, 20 figures.

In the same way, AND gate G is opened only when the keys A ⊠ B ⊟ have been pushed down, and hence if electric energy of battery B is supplied to the non-volatile circuit L, the condition immediately before a certain key is pushed down is memorized and reserved even if no power source is used, so that it is possible to carry out ordinary operations.

Since the battery B is consumed only when a key top is depressed, or when an operation is carried out in the circuit, its life is noticeably prolonged. Particularly, when an unskilled operator uses the apparatus, a considerably long time is spent from the first depression of a key to the next one, so that as compared with conventional apparatus in which battery consumption continues during such time, a marked prolongation of battery life is realized by use of the present device.

Figure 6:
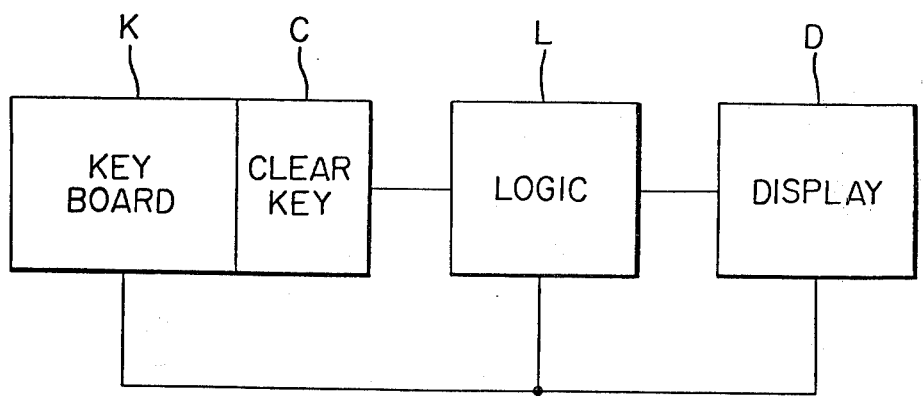
FIG. 6 is a block diagram showing a third embodiment of the present invention.

However, the battery must be exchanged with a new one sooner or later, and there still exist the incommodities that it might fail to provide sufficient power in the case of emergency, and that charging may be required some time during use. Expense for the purchase of battery is also a matter that counts. FIG. 6 shows an embodiment where, in order to overcome such problems, there is employed means C for converting mechanical energy produced by depression of key a top into electric energy without using any power source such as battery. This arrangement permits semi-permanent use of the machine with no need of any specific power means. According to this embodiment, a piezo element or such is disposed below the key tops and electric energy is produced by striking this piezo element with the key top to thereby actuate the non-volatile semiconductor circuit L. In this case, too, the circuit is operated only when a key is pushed down. It is also possible to arrange plural piezo elements below the respective key tops so as to directly generate a 1 - 2 - 4 -8 encoded signal.

In case the key top striking force alone is insufficient to the required mechanical impressing force, it is advisable to provide means for increasing the striking force against the piezo element, such as for example a click mechanism or a compressed leaf spring below the key tops. Although this piezo element can provide sufficient electric output to operate the circuit, it is of course possible to additionally use other mechanical-electric converter means. For instance, a conductor may be provided spirally or in a coiled form in the print substrate while providing an elastic magnet (so-called rubber magnet) below the key tops so that an induced voltage is produced upon depression of a key to operate the circuit. It is also possible to use a known electret means or the like.

If the key board incorporated with the mechanical-electric converter means C of FIG. 6 is used in the arrangement of FIG. 5 and battery B is used as power source, it is possible to perform charging of the battery when pushing the key down. Arithmetic operations can be also carried out simultaneously. This arrangement can expand even more the battery life or the service life of the machine. Also, such arrangement, where the battery is charged from the mechanical-electric converter means, can be effectively adapted not only to the system in which the power is connected only when a key is pushed down as in the embodiment of FIG. 5, but also to conventional systems where the battery is constantly connected to an ordinary volatile semiconductor operation circuit so that power is consumed throughout the period of operation. In this case, although the battery is consumed during the period of operation, since mechanical energy produced by push-down of key top is converted into electric energy by piezo element or other means and charging is effected upon every depression of a key top, the wastage time of the battery is shortened and also the number of times charging is required is reduced to prolong the service time of the machine. Instead of directly charging the battery, electricity may be once accumulated in a capacitor or such and then supplied to the battery to charge it. It is also possible to accumulate electric energy in the capacitor alone and to discharge it during use of the machine without using any battery. Examples of such arrangements are shown in FIGS. 7 and 8.

Figure 7:
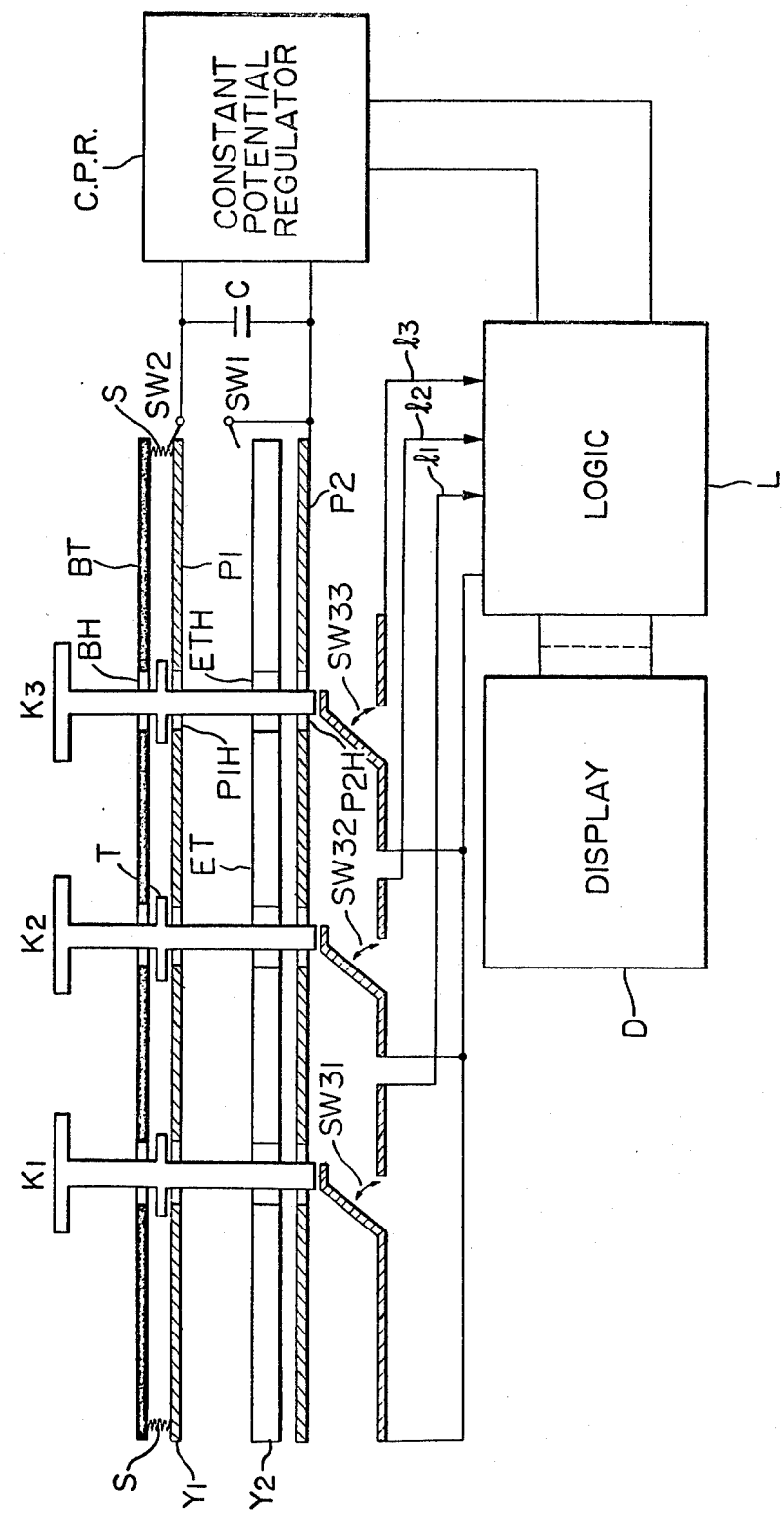
FIG. 7 is a drawing showing a detailed arrangement of the embodiment shown in FIG. 6.
Figure 8:
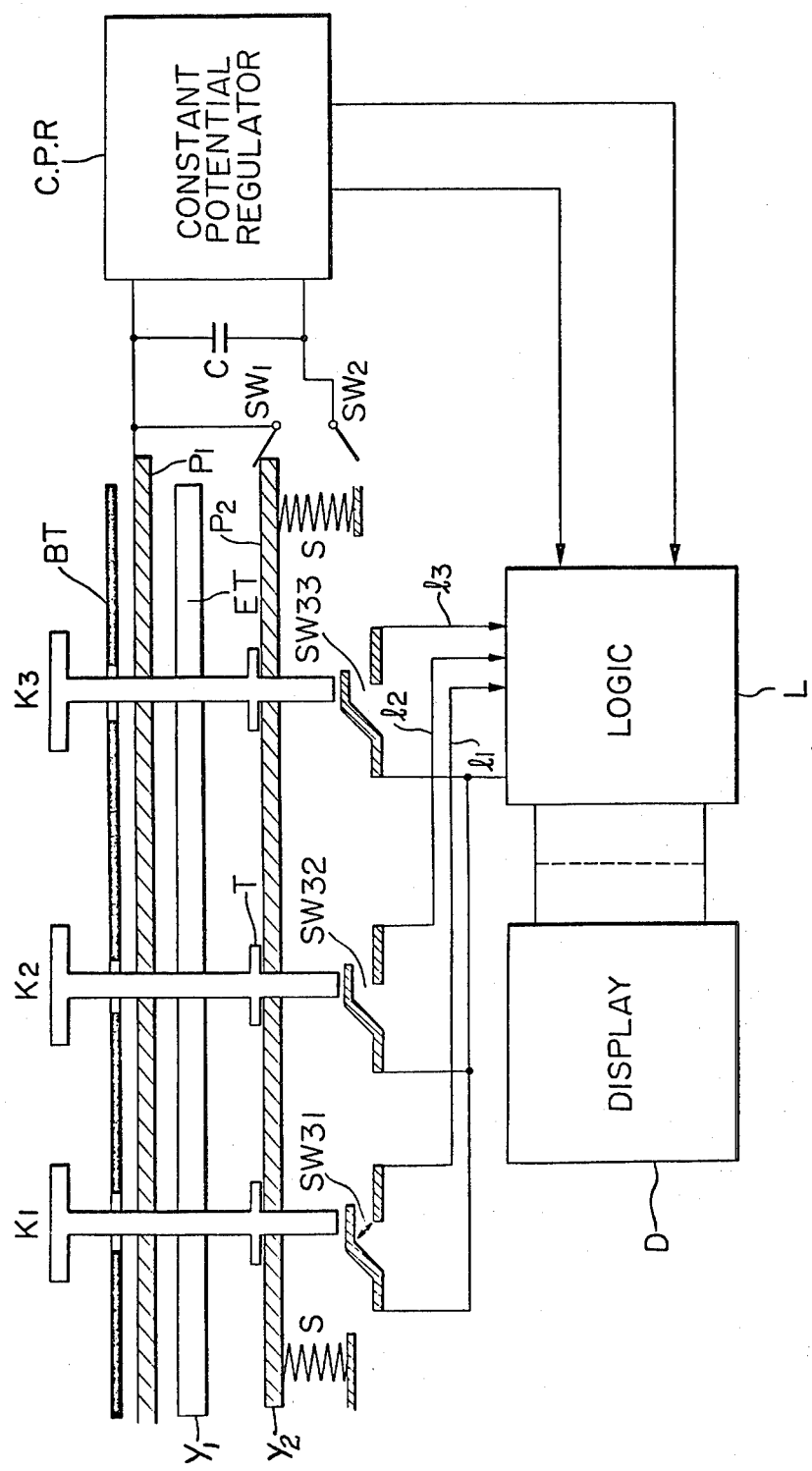
FIG. 8 is a drawing showing a modification of the embodiment of FIG. 7.

Referring to FIG. 7, K1-K3 designate key tops in, for instance, a small-sized electronic calculator, BT a cover plate formed with holes BH in correspondence to the respective keys, P1 and P2 electrode plates also formed with holes P1H and P2H in correspondence to said respective keys, S return springs, ET a ferroelectric plate such as electret also formed with holes ETH in correspondence to the respective keys, SW1, SW2 and SW31–SW33 switches, C a capacitor, CPR a constant potential regulator, L a logic circuit, and D a display. In operation, when for instance the key top K2 is pushed down, the electrode plate P1 is forced to move down by the protuberant portion T of said key K2 from the position Y1 to the position Y2 while remaining substantially horizontal. When the electrode plate P1 reaches the position Y2, it contacts the switch SW1, whereupon both electrode plates P1 and P2 come to have the same potential. The switch SW32 is also closed, but in the initial depression of the key, no charges are accumulated in the capacitor C, so that it is impossible to judge the fact that the key K2 has been pushed down. Thus, if the push on the key K2 is released after both electrode plates P1 and P2 have assumed the same potential, said key K2 is raised up to its original position by the tension of springs S. In this process, charges are induced to the electrodes P1 and P2 by the action of the ferroelectric plate (such as electret), and when the electrode P1 returns to the position Y1, it contacts the switch SW2 and the charges induced to said electrodes P1 and P2 are accumulated in the capacitor C. As the output of this capacitor C is connected to the constant potential regulator CPR, the induced voltage is quantificated by said regulator CPR and applied to the logic circuit L. As the capacitor C is charged by the operations conducted so far, the system assumes the same arrangement as the ordinary small-sized electronic calculator containing a battery as a power source. Therefore, the next key operation is same as in the ordinary system, and contact or non-contact of switches SW31–SW33 is determined by the logic circuit L to judge the depression of keys K1–K3, and the same operation as in the conventional methods is performed. Here, as said first key operation merely effects charging of the capacitor C, this key should preferably be a clear key Ⅽ, though it is not essential. FIG. 8 shows an arrangement where the movable electrode is positioned contrariwise to the arrangement of FIG. 7. According to this arrangement, the electrode P2 descends to induce charges as the key is pushed down, and as the electrode contacts the switch SW2, the capacitor C is charged. That is, in the arrangement of FIG. 7, charges are induced in the course of the return stroke of the key, whereas in the arrangement of FIG. 8, charges are induced in the course of depression of the key, allowing actuation of the system from the first key movement. Electric energy E generated in this arrangement is expressed by the following formula:

$$E = \tfrac{1}{2}[A^2\sigma^2/(C' + \epsilon_o S/d)]$$

A: surface area of ET
$\sigma$: surface charge density
C': static capacity of C
$\epsilon$: vacuum permittivity
d: distance between Y1 and Y2
S: surface area of electrode Therefore, if $\sigma$, C' d and S are supposed to be constant, produced energy E can be expressed as a function of $A^2$, that is, the greater the surface area A, the higher the energy produced. In this example, ET is supposed to be composed of one layer, but if it is supposed that it is composed of N layers, energy $E_N$ produced is given by:

$$E_N = N^2 E$$

In this case, therefore, there can be obtained $N^2$ times as high energy as in the case of one layer. Also, in the embodiment of FIG. 7, negative induced charges are produced in the movable electrode plate P1 when it is moved from the point Y1 to the point Y2, owing to properties of the electret. Here, if rectifying diodes are used instead of switches SW1 and SW2 to effect full-wave rectification, conversion efficiency can be elevated even more. Additional power savings are realized by using complementary metal oxide semiconductors (CMOS) for logic circuit and low-consuming elements such as liquid crystals for display D.

If non-volatile material is used for logic circuit L and display D, their operations become even more positive and reliable. For instance, as non-volatile display material, there may be used nematic and cholesteric mixed crystal, cholesteric liquid crystal formed by capsulating the mixture of cholesteryl nonanoate, cholesteryl chloride and cholsteryl synamate mixed at the rate of 70:25:5, non-regular ferro-derivatives such as $Gd_2(MoO_4)$ or its isomophous materials, or electrochromic materials utilizing redox. As for non-volatile semiconductor circuits, there can be used tunnel effect type materials such as MNOS (metal - nitrated film - oxide film - semiconductor), MAS (metal - alumina film - semiconductor) or MAOS (metal - alumina film - oxide layer - semiconductor), avalanche type and many other types of materials. The present invention can be adapted not only to calculators of the type described but also all other types of machines having a key board such as electronic typewriters.

What is claimed is:

1. Electronic apparatus of the type which performs arithmetic operations in response to entered instructions, comprising:

information input means for entering signals into said apparatus, said input means including a mechanical-electrical energy transducer;

an electrical energy storage means coupled to said input means;

a logic circuit coupled to said storage means for carrying out arithmetic operations in response to the information signals, said logic circuit including at least one persistent logic element operative to hold a memory content when said storage is disconnected; and display means coupled to said logic circuit for selectively displaying numerals, letter symbols and the like, said display means including at least one persistent display material operative to hold a display content when said storage means is disconnected.

2. Electronic apparatus according to claim 1 wherein said electrical energy storage means includes a battery.

3. Electronic apparatus according to claim 1 wherein said storage means includes a capacitor.

4. Electronic apparatus according to claim 1 wherein said apparatus includes a desk-top calculator.

5. Electronic apparatus according to claim 1 wherein said information input means includes a clear key, and wherein said storage means is connected to said logic circuit upon depression of said clear key.

6. Electronic apparatus of the type which performs arithmetic operations in response to entered instructions, comprising:
information input means for entering signals into said apparatus, said input means including a mechanical-electrical energy transducer;
an electrical energy storage means coupled to said transducer;
a logic circuit coupled to said storage means for carrying out arithmetic operations in response to the information signals, said logic circuit including at least one persistent logic element operative to hold a memory content when said storage means is disconnected; and
printing means coupled to said logic circuit for selectively printing numerals, letter symbols and the like.

7. Electronic apparatus according to claim 6 wherein said electrical energy storage means includes a battery.

8. Electronic apparatus according to claim 6 wherein said electrical energy storage means includes a capacitor.

9. Electronic apparatus according to claim 6 wherein said apparatus includes a desk-top calculator.

10. Electronic apparatus according to claim 6 wherein said information input means includes a clear key, and wherein said storage means is connected to said logic circuit upon depression of said clear key.

11. Electronic apparatus of the type which performs arithmetic operations in response to entered instruction, comprising:
information input means for entering signals into said apparatus;
a nonelectrical-electrical energy transducer apparatus;
an electrical energy storage means coupled to said transducer;
a logic circuit coupled to said storage means for carrying out arithmetic operations in response to the information signals, said logic circuit including at least one persistent logic element operative to hold a memory content when said storage means is disconnected; and
output means coupled to said logic circuit for selectively outputting numerals, letter symbols and the like.

12. Electronic apparatus according to claim 11 wherein said electrical energy storage means includes a battery.

13. Electronic apparatus according to claim 11 wherein said electrical energy storage means includes a capacitor.

14. Electronic apparatus according to claim 11 wherein said apparatus includes a desk-top calculator.

15. Electronic apparatus according to claim 11 wherein said information input means includes a clear key, and wherein said storage means is connected to said logic circuit upon depression of said clear key.

16. Electronic apparatus of the type which performs arithmetic operations in response to entered instructions, comprising:
information input means for entering signals into said apparatus;
a nonelectrical-electrical energy transducer apparatus;
an electrical energy storage means coupled to said transducer;
a logic circuit coupled to said storage means for carrying out arithmetic operations in response to the information signals; and
display means coupled to said logic circuit for selectively displaying numerals, letter symbols and the like, said display means including at least one persistent display material operative to hold a display content when said storage means is disconnected.

17. Electronic apparatus according to claim 16, wherein said electrical energy storage means includes a battery.

18. Electronic apparatus according to claim 16 wherein said electrical energy storage means includes a capacitor.

19. Electronic apparatus according to claim 16 wherein said apparatus includes a desk-top calculator.

20. Electronic apparatus according to claim 16 wherein said information input means includes a clear key, and said storage means is connected to said logic circuit upon depression of said clear key.

21. An electronic apparatus comprising:
a mechanical-electrical converter for converting mechanical energy into electrical energy;
energy storing means coupled to said converter for storing the electrical energy generated from said converter;
regulating means coupled to said energy storing means for regulating the electrical energy stored in said energy storing means to maintain a constant potential;
a low power dissipation logic circuit coupled to said regulating means for performing arithmetic operations in response to an instruction signal; and
a low power dissipation display coupled to said logic circuit for selectively displaying numerals, characters, symbol marks and the like in response to an output signal from said logic circuit.

22. An electronic apparatus according to claim 21 wherein said converter includes a keyboard having a plurality of keys, the depression of any one of which generates electrical energy, wherein the generated electrical energy is stored in said energy storing means.

23. An electronic apparatus according to claim 21 wherein said low power dissipation logic circuit includes a persistent semiconductor.

24. An electronic apparatus according to claim 21 wherein said low power dissipation display includes a persistent display material.

* * * * *

UNITED STATES PATENT AND TRADEMARK OFFICE
CERTIFICATE OF CORRECTION

PATENT NO. : 4,144,580

DATED : March 13, 1979

INVENTOR(S) : MITSUAKI SEKI ET AL

It is certified that error appears in the above-identified patent and that said Letters Patent are hereby corrected as shown below:

Column 4, line 31, "of key a top" should read
--of a key top--;

Column 5, line 8, "push-down of key top" should read
--depression of the key-top--;

Signed and Sealed this

*Twenty-first* Day of *August 1979*

[SEAL]

*Attest:*

*Attesting Officer*

LUTRELLE F. PARKER
*Acting Commissioner of Patents and Trademarks*